W. J. NESBITT.
HEEL CUTTING APPARATUS.
APPLICATION FILED NOV. 28, 1913.
1,109,137.
Patented Sept. 1, 1914.
2 SHEETS—SHEET 1.
Fig. 1.
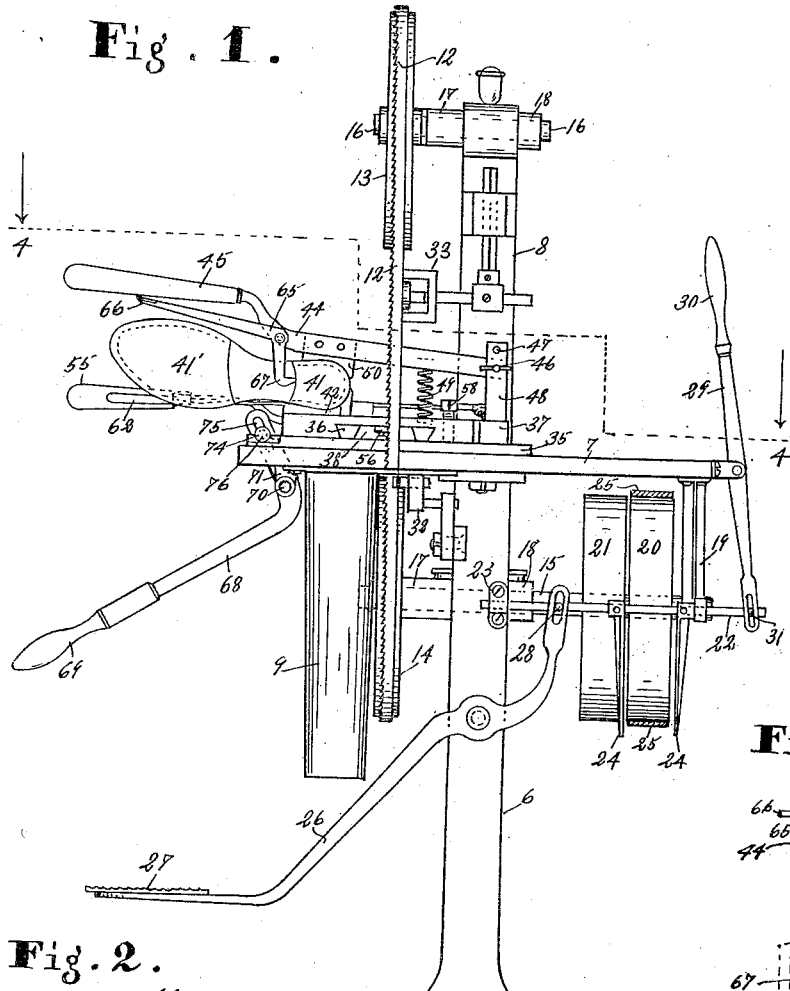
Fig. 3.
Fig. 2.
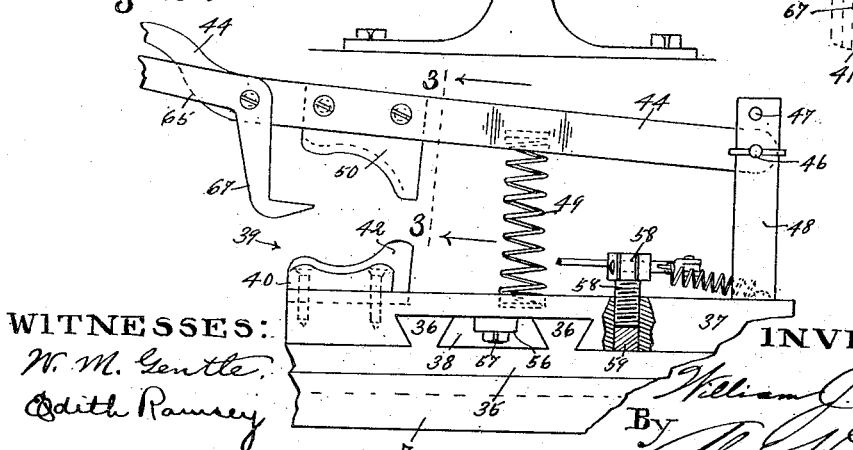
WITNESSES:
W. M. Gentle
Edith Ramsey
INVENTOR.
William J. Nesbitt
By Alex N. Lidders
ATTORNEY.

W. J. NESBITT.
HEEL CUTTING APPARATUS.
APPLICATION FILED NOV. 28, 1913.

1,109,137.

Patented Sept. 1, 1914.
2 SHEETS—SHEET 2.

WITNESSES:

INVENTOR.

ATTORNEY.

UNITED STATES PATENT OFFICE.

WILLIAM J. NESBITT, OF LOS ANGELES, CALIFORNIA.

HEEL-CUTTING APPARATUS.

1,109,137.  Specification of Letters Patent.  Patented Sept. 1, 1914.

Application filed November 28, 1913. Serial No. 803,616.

*To all whom it may concern:*

Be it known that I, WILLIAM J. NESBITT, a citizen of the United States of America, residing at Los Angeles, county of Los Angeles, State of California, have invented a certain new and useful Heel-Cutting Apparatus; and I do hereby declare the following to be a full, clear, and exact description of the invention, such as will enable others skilled in the art to which it appertains to make and use the same.

This invention relates to improvements in heel cutting apparatus, more particularly to improvements in the heel cutting apparatus disclosed in my application for patent filed Oct. 4, 1913, Serial No. 793,476.

Objects of the invention are to provide improvements in the apparatus which facilitate manipulation and operation of the apparatus, cause better working of the apparatus, and which enable the operator to save time and effect better results.

Further objects of the invention are to provide novel and improved devices for holding and quickly clamping different sizes of shoe heels and for easily and quickly adjusting the heels so that the desired part of the heel may be sawed off.

Other objects and the advantages of the invention will be apparent to those skilled in the art from a careful consideration of the following description of the preferred form of construction embodying the invention, taken in connection with the accompanying drawings in which—

Figure 4:
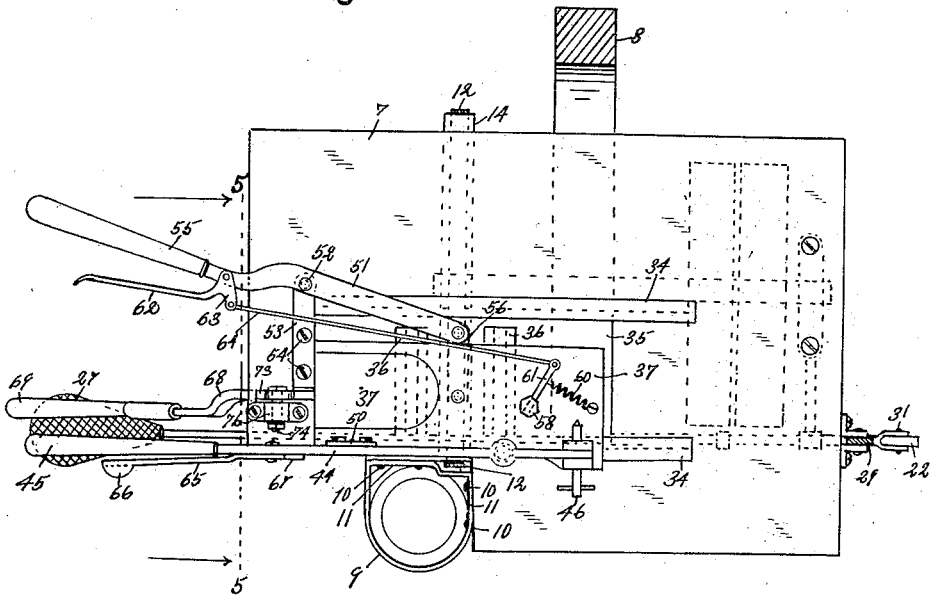
Figure 5:
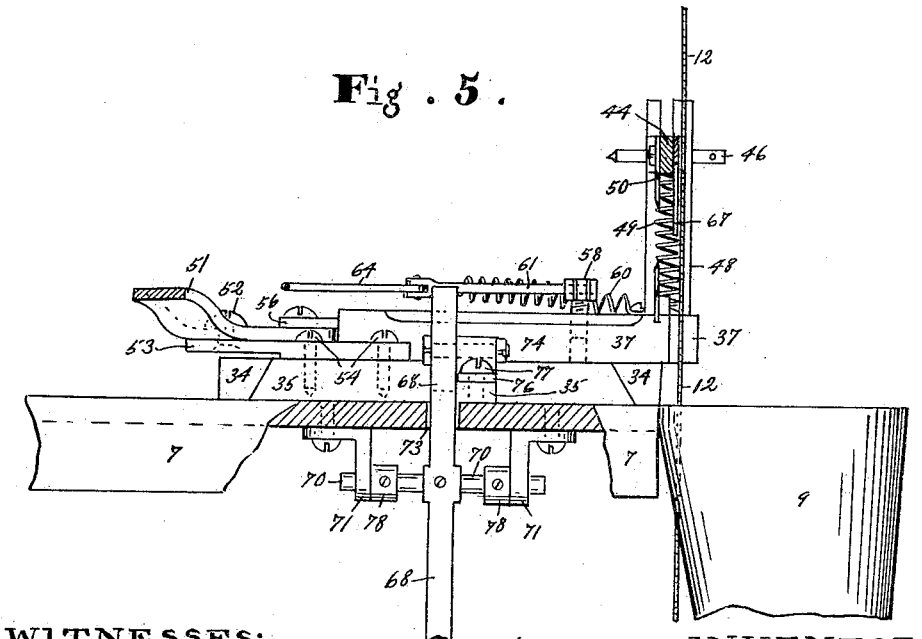

Figure 1 is a side elevational view of the apparatus; Fig. 2 is an enlarged broken and partly sectional view of a portion of the apparatus; Fig. 3 is a view taken on the line 3—3 of Fig. 2; Fig. 4 is a view taken on the line 4—4 of Fig. 1; and Fig. 5 is an enlarged view taken on the line 5—5 of Fig. 4.

The post 6 has thereon the platform 7 and the standard 8 which latter extends upwardly above the platform at one side of the platform. At one of the sides the forward end portion of the platform 7 is cut away and has suitably secured thereto a chute or receptacle 9 for the refuse resulting in working the apparatus. The chute 9 is preferably secured to the edge of the platform by means of screws 10 passing through a flange 11 on the upper part of the chute. A portion of the flange 11 is offset from the side edge of the platform 7 to accommodate the band saw 12 which passes around wheels 13 and 14 on shafts 15 and 16 which latter are mounted in suitable bearings 17 and 18 on the post 6 and standard 8. The rear end portion of the shaft 15 bears on the bracket 19 which is suitably secured to the platform 7, and said rear end portion has thereon the loose pulley 20 and the fast pulley 21. A rod 22 is slidably mounted on the bracket 19 and on the bracket 23 on the post 6 and it has thereon the spaced fingers 24 for shifting the driving belt 25 from one to the other of the pulleys 20 and 21. The rod 22 may be foot-operated by the lever 26 which is pivotally mounted on the post 6 and which has its forward end portion formed to provide a pedal 27 and has its rear end portion slotted and fitted on a pin 28 on the rod 22. Also the rod 22 may be hand operated by the lever 29 which is pivotally mounted on the rear end of the platform 7 and which has a handle 30 on its upper end and has its lower end portion slotted and fitted on a pin 31 on the rod 22. The band saw 12 may be guided and held in position by any suitable or approved devices—those indicated at 32 and 33 being of the usual form need not be described in detail here.

Between guide bars 34 which extend longitudinally of and are suitably secured to the platform 7 is slidably arranged a table 35 which latter is provided with guide bars 36 extending transversely and having slidably mounted thereon the table 37 which has a cutaway portion 38 on the underside thereof. At the forward end of the side portion of the table 37 adjacent to the band saw 12 is stationarily mounted a heel rest 39 which preferably consists of a curved block 40 suitably secured to the table 37 and on which the side of the heel 41 of a shoe 41' may bear, and a curved edged blade 42 disposed at the side of the block 40 and adapted to fit in the hollow 43 between the heel 41 and the insole or upper leather of the shoe 41' to hold the heel against lateral displacement. A lever 44 having a handle 45 on its forward end and having its rear end pivotally mounted on a pin 46 adapted to fit through any one of a series of openings 47 in a bifurcated standard 48 on the rear part of the table 37, is upwardly pressed by a coil spring 49 interposed between it and the table 37 and it has thereon a curved edged blade 50 adapted to fit in the hollow between the heel 41 and the insole or upper leather of the shoe so that when the heel is placed on the heel rest 39 the lever 44 may be moved downwardly and held to clamp the heel in position.

The table 37 may be moved toward or away from the band saw 12 by swinging lever 51 which is mounted on pivot 52 on an arm 53 secured to the table 35 by screws 54 and which has a handle 55 on its forward end and has its rear end pivotally connected with one end of a link 56 which latter extends into the cutaway portion 38 and is pivotally connected with the table 37 by means of a bolt 57. By swinging the lever 51 to the left the table 37 may be adjusted to the desired degree to bring the heel of the shoe into the path of the band saw 12 for cutting away a part of the heel. The table 37 is locked in adjusted position by turning to the right the screw 58 in the table 37 to have the lower end of the screw 58 bear against a block 59 loosely disposed below the screw 58 and an opening in the table 37 and thereby raise the table 37 into frictional engagement with the guide bars 36. The screw 58 is automatically turned to lock the table 37 by a spring 60 which latter has one end thereof suitably secured to the table 37 and has the other end thereof attached to an arm 61 affixed on the screw 58. The screw 58 may be turned to unlock the table 37 by pulling the handle 62 which is disposed adjacent to the handle 55 and has thereon a bell-crank 63 which latter is pivotally mounted on the lever 51 and operatively connected with the arm 61 by the connecting rod 64.

A heel abutting device which is easily and quickly adjustable for different sizes and shapes of heels preferably consists of an angular lever 65 which is pivotally mounted on the lever 44 and has at one end thereof a handle 66 disposed adjacent to the handle 45 and has at the other end thereof an abutment 67 adapted to engage the forward part of the heel of the shoe. When the lever 44 is held down to clamp the heel of the shoe on the heel rest 39 and the handle 66 is at the same time pressed down to hold the abutment 67 against the heel, the angular lever 68 may be moved upwardly by handle 69 thereon to move the tables 35 and 37 rearwardly and thereby cause movement of the heel past the band saw 12 to cut away a part of the heel.

The lever 68 is mounted on a shaft 70 bearing in brackets 71 suitably secured to the underside of the platform 7. Said lever 68 has its rear end portion passed through a slot 73 in the platform 7 and connected with the table 35 by means of a pin 74 which latter passes freely through a slot 75 in the lever 68 and is affixed on the forward part of the table 35 by means of a strap 76 which is secured to the table 35 by screws 77. Adjustable collars 78 on the shaft 70 are adapted to bear against the sides of the brackets 71 and permit of easily and quickly adjusting the shaft 70 and lever 68 to the desired position.

The form of construction which has been particularly illustrated and described admits of many minor changes and modifications thereof, wherefore the right is reserved to all such changes and modifications as do not depart from the spirit and scope of the invention as defined in the appended claims.

I claim:

1. In apparatus of the class specified, the combination of a table, means including a lever on said table for holding and clamping the heel of a shoe, and an angular lever pivotally mounted on said lever and having thereon an abutment adapted to bear against the forward part of the heel, substantially as described.

2. In apparatus of the class specified, the combination of a table, a second table mounted on the first table, means including a lever whereby the second table is adjustable in position on the first table, means including a screw on the second table for locking the second table in adjusted position on the first table, an arm on the screw, a spring connected with the second table and said arm and adapted to turn the screw to lock the second table in position on the first table, and means for turning the screw to unlock said second table, the last named means including a bell crank pivotally mounted on the lever, a handle on the bell crank, and a rod operatively connecting the bell crank with the arm, substantially as described.

3. In apparatus of the class specified, the combination of a table, means including a pivotally mounted lever carried on said table for holding and clamping the heel of a shoe, a spring interposed between said table and said lever, and an angular lever pivotally mounted on said lever and having thereon an abutment adapted to bear against the forward part of the heel, substantially as described.

4. In apparatus of the class specified, the combination of a saw, a table, a second table thereon, means including a lever pivotally mounted on the second table for holding and clamping the heel of a shoe, a spring interposed between the second table and said lever, an angular lever pivotally mounted on said lever and provided with an abutment adapted to bear against the forward part of the heel, means including a lever whereby the second table is adjustable on the first table, means including a screw on the second table for locking the second table in adjusted position on the first table, an arm on the screw, a spring connected with the second table and said arm and adapted to turn the screw to lock the second table, means for turning the screw to unlock the second table, the last named means including a bell crank pivotally mounted on the last named lever and a rod operatively connecting the bell crank with the arm, and means for operating the first table to move the heel past the saw to cut away a part of the heel, substantially as described.

5. Apparatus of the class specified, comprising a platform, a table movably mounted on the platform, a band saw at one side of the table, a chute secured to the platform adjacent to the band saw, a second table movable transversely on the first table, means including a spring-pressed lever pivotally mounted on the second table for holding and clamping the heel of a shoe, an angular lever pivotally mounted on said lever and provided with an abutment adapted to bear against the forward part of the heel, means including a lever for adjusting the position of the second table on the first table, means including a screw on the second table for locking the second table in adjusted position, an arm on the screw, a spring adapted to turn the screw to lock the second table in position, means for turning the screw to unlock the second table, the last named means including a bell crank pivotally mounted on the last named lever and a rod operatively connecting the bell crank with the arm, and means for operating the first table to move the heel past the band saw to cut away a part of the heel, substantially as described.

In testimony whereof, I have signed my name to this specification in the presence of two subscribing witnesses at Los Angeles, county of Los Angeles, State of California, this 21st day of November A. D. 1913.

WILLIAM J. NESBITT.

Witnesses:
ALEX. H. LIDDERS,
W. A. AMEND.

---

Copies of this patent may be obtained for five cents each, by addressing the "Commissioner of Patents, Washington, D. C."